United States Patent
Boys

(10) Patent No.: US 11,522,389 B2
(45) Date of Patent: Dec. 6, 2022

(54) INDUCTIVELY COUPLED AC POWER TRANSFER

(75) Inventor: John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 705 days.

(21) Appl. No.: 12/998,031

(22) PCT Filed: Sep. 11, 2009

(86) PCT No.: PCT/NZ2009/000191
§ 371 (c)(1),
(2), (4) Date: May 16, 2011

(87) PCT Pub. No.: WO2010/030195
PCT Pub. Date: Mar. 18, 2010

(65) Prior Publication Data
US 2011/0221277 A1 Sep. 15, 2011

(30) Foreign Application Priority Data

Sep. 11, 2008 (NZ) ........................................ 571222
Apr. 17, 2009 (NZ) ........................................ 576320

(51) Int. Cl.
*H02J 50/12* (2016.01)
*H02M 3/335* (2006.01)

(52) U.S. Cl.
CPC ......... *H02J 50/12* (2016.02); *H02M 3/33576* (2013.01)

(58) Field of Classification Search
CPC .................................. H02J 50/00; H04B 5/00
(Continued)

(56) References Cited

U.S. PATENT DOCUMENTS

| | | | |
|---|---|---|---|
| 5,207,304 A * | 5/1993 | Lechner | B60L 9/00 191/10 |
| 5,218,283 A | 6/1993 | Wills et al. | |

(Continued)

FOREIGN PATENT DOCUMENTS

| | | |
|---|---|---|
| CN | 1721013 | 1/2006 |
| JP | 2002369415 | 12/2002 |

(Continued)

OTHER PUBLICATIONS

International Preliminary Report on Patentability and Written Opinion dated Mar. 15, 2011 in corresponding PCT application PCT/NZ2009/000191.

(Continued)

*Primary Examiner* — Adi Amrany
(74) *Attorney, Agent, or Firm* — Edell, Shapiro & Finnan, LLC

(57) ABSTRACT

An Inductive Power Transfer System pickup provides a controlled AC power supply by controlled variation of the phase angle between the pickup coil induced voltage (jwMI) and the tuning capacitor C voltage. The phase angle can be varied by maintaining the tuning capacitor C voltage substantially constant for a selected time period. Switches S1 and S2 may be used to clamp the tuning capacitor C voltage at substantially zero volts during the selected time period. Switch S1 can be operated to prevent a rise in positive voltage across the tuning capacitor, and switch S2 can be used to prevent the voltage across the tuning capacitor from going negative.

6 Claims, 5 Drawing Sheets

A practical implementation of the circuit of Figure 3 with a DC rectifier to convert to a DC output.

(58) Field of Classification Search
USPC .......................................................... 307/104
See application file for complete search history.

(56) References Cited

U.S. PATENT DOCUMENTS

| | | | |
|---|---|---|---|
| 5,243,268 A * | 9/1993 | Klatt | H02P 25/024 |
| | | | 318/732 |
| 5,701,121 A * | 12/1997 | Murdoch | 340/10.34 |
| 6,301,128 B1 * | 10/2001 | Jang | H02J 5/005 |
| | | | 363/17 |
| 6,346,800 B1 * | 2/2002 | Mano | G03G 15/20 |
| | | | 323/225 |
| 6,515,878 B1 | 2/2003 | Meins et al. | |
| 6,705,441 B1 | 3/2004 | Boys et al. | |
| 8,093,758 B2 * | 1/2012 | Hussmann et al. | 307/105 |
| 8,878,393 B2 * | 11/2014 | Kirby | H02J 50/60 |
| | | | 307/104 |
| 2001/0012208 A1 | 8/2001 | Boys | |
| 2005/0288739 A1 | 12/2005 | Hassler et al. | |
| 2006/0208707 A1 | 9/2006 | Jacobson et al. | |
| 2007/0109708 A1 | 5/2007 | Hussman et al. | |
| 2007/0164122 A1 * | 7/2007 | Ju | G06K 19/0701 |
| | | | 235/492 |
| 2008/0169706 A1 * | 7/2008 | Onishi | H02J 50/12 |
| | | | 320/108 |
| 2008/0211478 A1 * | 9/2008 | Hussman | H02M 3/3374 |
| | | | 323/355 |
| 2009/0096413 A1 * | 4/2009 | Partovi | H02J 50/80 |
| | | | 320/108 |
| 2009/0286476 A1 * | 11/2009 | Toncich | G06K 7/10178 |
| | | | 455/41.1 |
| 2009/0302933 A1 * | 12/2009 | Boys | H02J 50/12 |
| | | | 327/553 |
| 2011/0090723 A1 * | 4/2011 | Hu et al. | 363/74 |
| 2011/0299313 A1 * | 12/2011 | Hussmann et al. | 363/133 |
| 2012/0217111 A1 * | 8/2012 | Boys et al. | 191/10 |

FOREIGN PATENT DOCUMENTS

| | | |
|---|---|---|
| JP | 2006006948 | 1/2006 |
| JP | 2007501600 | 1/2007 |

OTHER PUBLICATIONS

Si et al., "A Frequency Control Method For Regulating Wireless Power to Implantabl Devices," IEEE Transaction on Biomedical Circuits and Systems, vol. 2, No. 1, Mar. 2008, pp. 22-29.

* cited by examiner

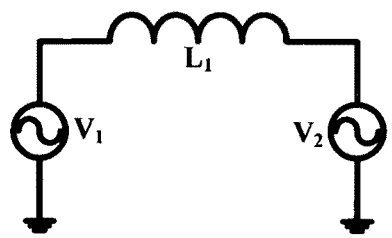
Figure 1: Power Transfer diagram
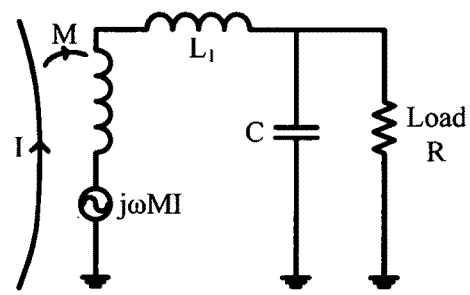
Figure 2: IPT pick-up diagram
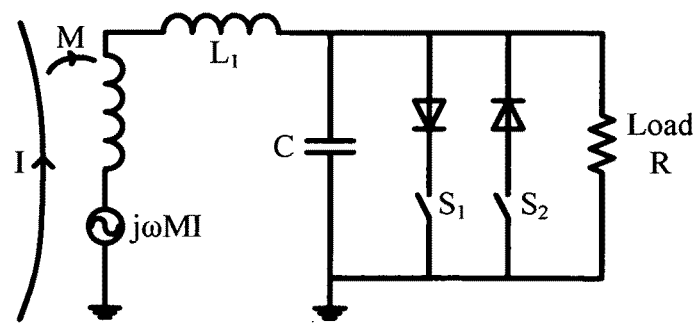
Figure 3: Forced-phase controller using two switches

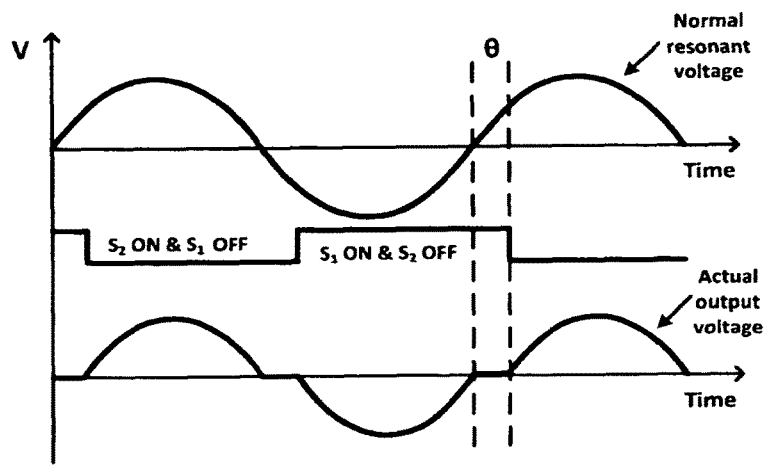
Figure 4: Phase shifting by controlled switching
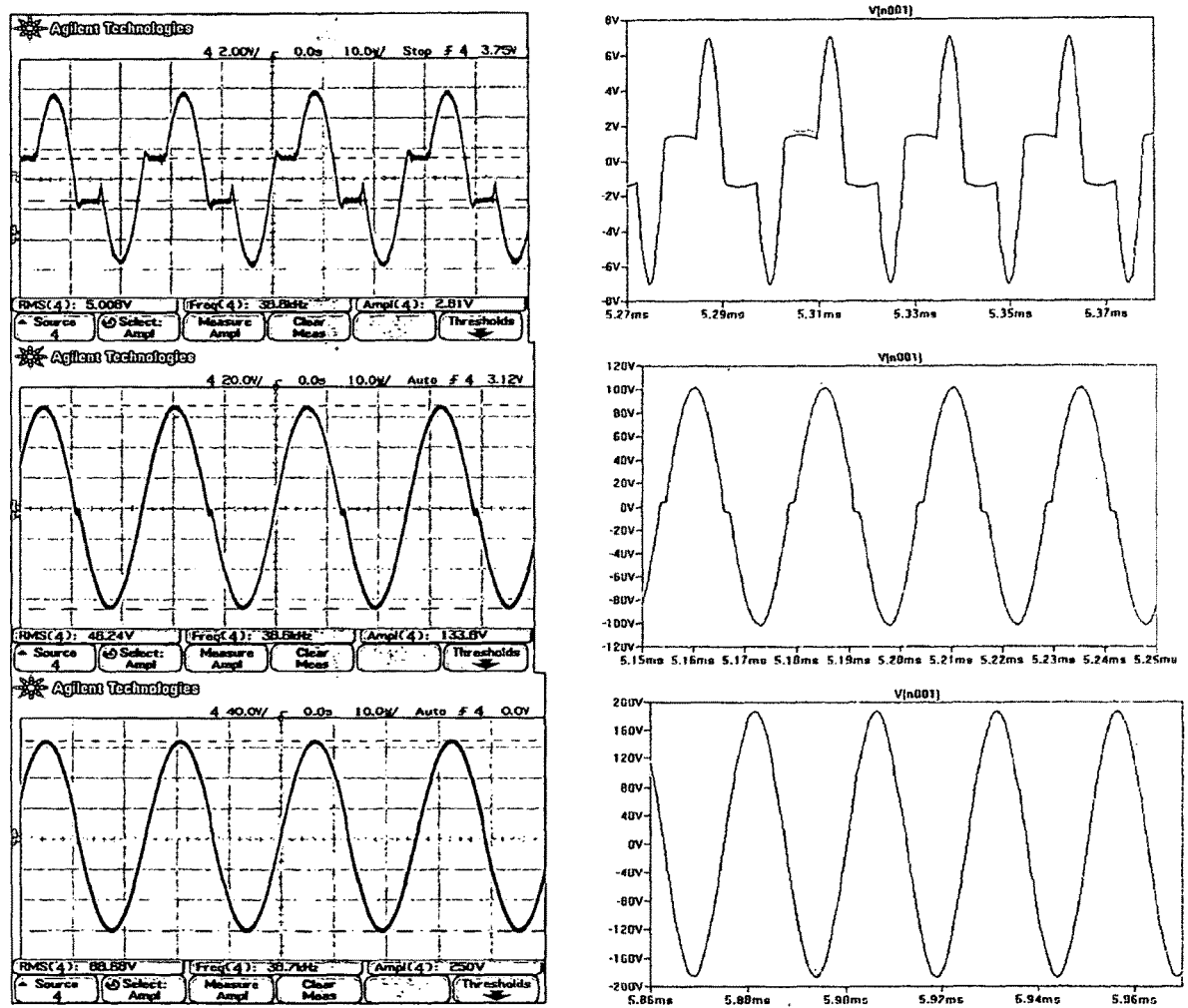
Figure 5: measured waveforms (left) and simulated waveforms (right)
Upper - low Q, Middle - medium Q, Lower – high Q

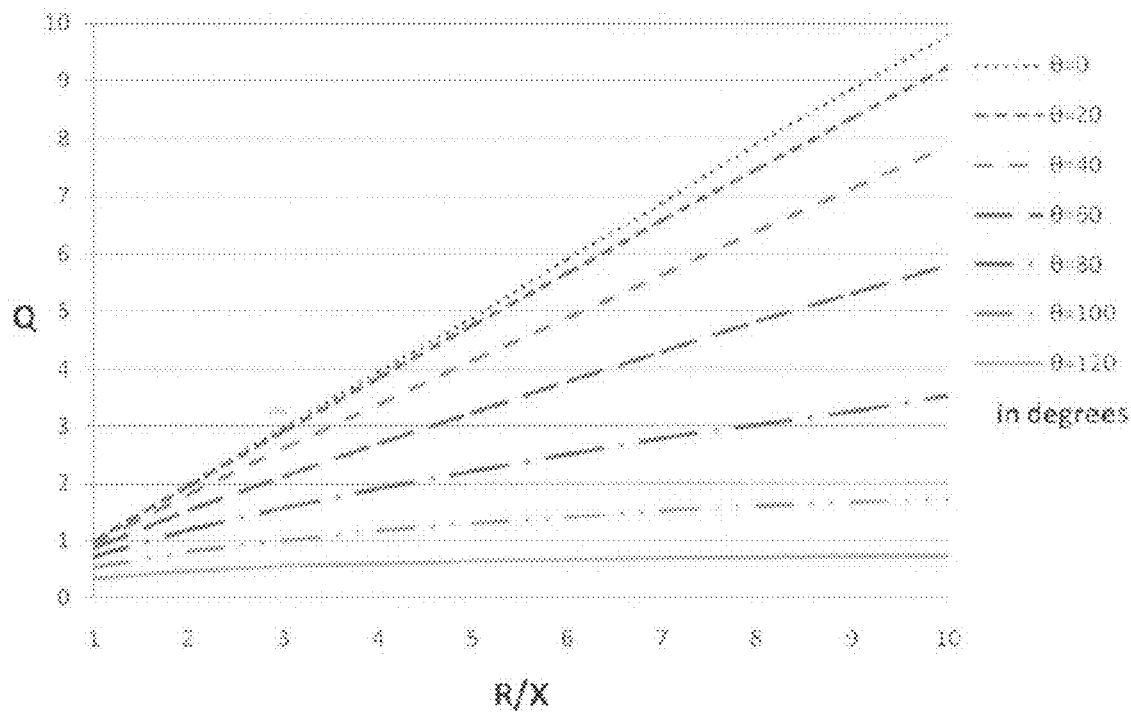
Figure 6: The observable Q (Output voltage divided by induced voltage = $\frac{V_2}{V_1}$) for a range of θ and normalized load resistance. Note X is the reactance of the pick-up coil.
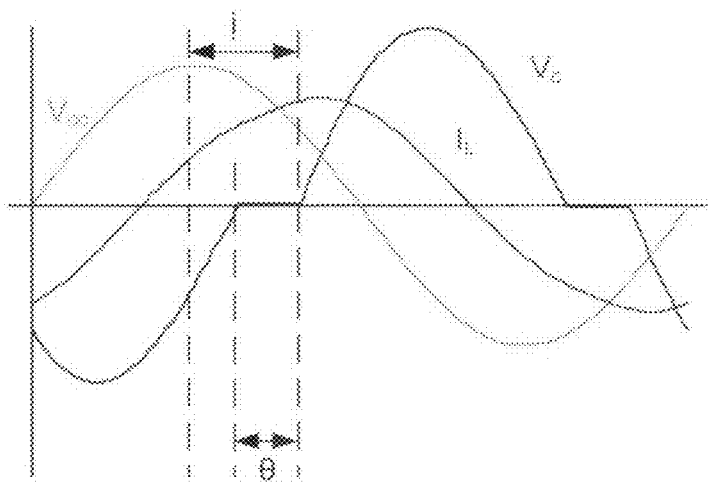
Figure 7: The definition of the possible control angles θ and θ̂. In practice the ideal control angle θ cannot be observed but θ̂ can always be observed.

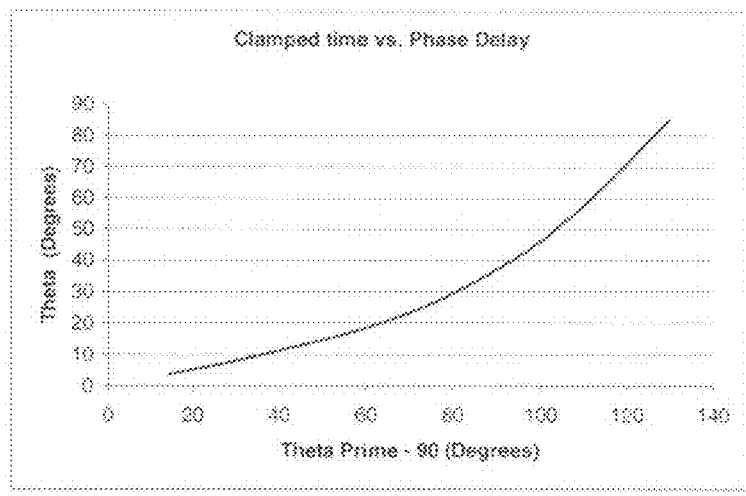
Fig. 8. The relationship between θ and θ́ for a circuit with a Q of 5. Other Q values give a very similar result. If θ́ is known then θ is uniquely determined.
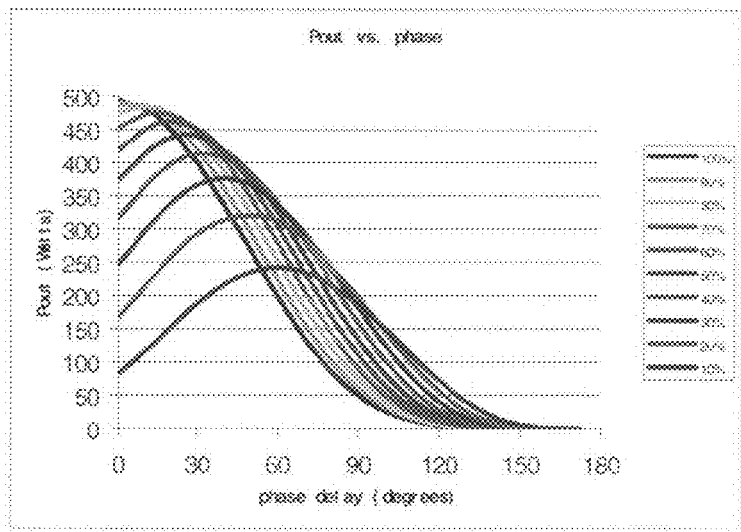
Fig. 9. The variation in output power for different tuning capacitors as a % of the ideal tuning capacitor.

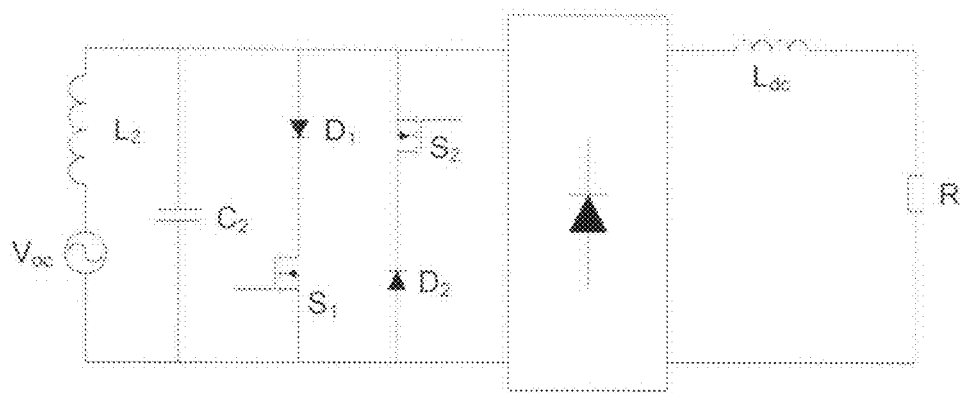
Fig. 10. A practical implementation of the circuit of Figure 3 with a DC rectifier to convert to a DC output.
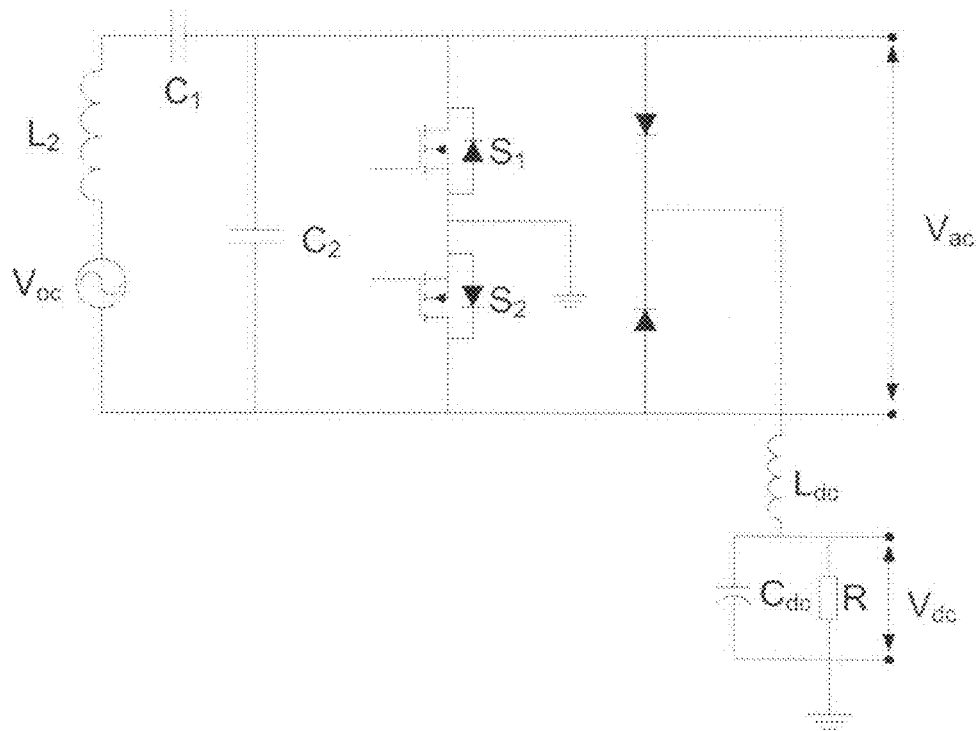
Fig. 11. A practical implementation of the circuit of Figure 3 circuit minimising the component count and providing both an AC and a DC output. This circuit uses exactly the same number of components as the AC only circuit of Figure 3.

INDUCTIVELY COUPLED AC POWER TRANSFER

FIELD OF THE INVENTION

This invention relates to Inductive Power Transfer (IPT) and has particular, but not sole, application to the provision of an AC power source. The invention may also be used to provide a DC power source.

BACKGROUND

IPT systems are now widely used in industry and elsewhere to couple power from one reference frame to another without physical contact. An example of such a system is described in U.S. Pat. No. 5,293,308, the contents of which are incorporated herein by reference. Wherever such systems are used the method for controlling the power transferred always involves a rectification stage so that the actual output from an IPT system is a controlled DC voltage to which consumer loads may be connected. If, for example, the consumer required an AC source of power then the IPT system would be used to drive an inverter and the output of that inverter would be used to drive the consumer's load. In these circumstances there are several power transfer stages: IPT from a primary track to a (tuned) pick-up coil, rectification from AC to DC with power transfer control using some decoupling technique, power electronics inversion from DC to AC, and wiring to the consumer load. There are significant advantages to this method as the inverter stage regenerates an AC frequency; it can supply any VAR requirements from the load, and it allows flexibility of operation. However, it is clearly less efficient than a technique that can go directly from the AC input to a controlled AC output at the same frequency.

OBJECT

It is an object of the invention to provide an IPT pickup, pickup controller or system that provides an AC power source, or to at least provide the public with a useful choice.

Alternatively or additionally an object of this invention is to enable direct AC to AC power conversion from an AC IPT track to an AC output at the same frequency controllable over a wide range of typically 5-250 V, with high efficiency, low distortion, and excellent resolution—typically better than 0.5 V.

SUMMARY OF THE INVENTION

In one aspect the disclosed subject matter provides a method of providing an AC supply from an IPT pickup having a pickup coil and tuning capacitor comprising a resonant circuit, the method including the step of varying the phase angle between the pickup coil induced voltage and the tuning capacitor voltage to provide a controlled AC supply to an output of the pickup.

In some embodiments the phase angle between the pickup coil induced voltage and the tuning capacitor voltage is varied by maintaining the tuning capacitor voltage substantially constant for a selected time period.

In some embodiments the selected time period is varied to vary the phase angle.

In some embodiments the step of maintaining the tuning capacitor voltage substantially constant includes clamping tuning capacitor the voltage at substantially zero volts.

In some embodiments step of clamping the tuning capacitor voltage includes operating a first switch to prevent a rise in positive voltage across the tuning capacitor.

In some embodiments the step of clamping the tuning capacitor voltage includes operating a second switch to prevent the voltage across the tuning capacitor from going negative.

In some embodiments the method includes the step of sensing a change in sign of the voltage across the tuning capacitor as a reference for controlling the selected time period.

In some embodiments the method includes the step of comparing the output of the pickup with a set point, and increasing or decreasing the selected time period to change the output of the pickup toward the set point.

In another aspect the disclosed subject matter provides a controller for an IPT pickup having a pickup coil and a tuning capacitor comprising a resonant circuit, the controller including one or more switches to control the tuning capacitor voltage to thereby vary a phase angle between the pickup coil induced voltage and the tuning capacitor voltage whereby the pickup provides a controlled AC supply to an output of the pickup.

In another aspect the disclosed subject matter provides an IPT pickup comprising a pickup coil and a tuning capacitor comprising a resonant circuit, and a controller to vary a phase angle between the pickup coil induced voltage and the tuning capacitor voltage to thereby provide a controlled AC supply to an output of the pickup.

In some embodiments the a rectifier is connected to the AC output to rectify the controlled AC supply to provide a DC output.

In another aspect the disclosed subject matter provides an IPT system including an IPT pickup or pickup controller according to any one of the preceding statements.

Advantageously, this power transfer method can be achieved using a technique whereby the through power is not switched by any power electronics devices at all so that the losses are kept small.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

BRIEF DRAWING DESCRIPTION

An embodiment of the invention will be described by way of example with reference to FIGS. 1-11 in which:

FIG. 1 is a known power system diagram.

FIG. 2 is the diagram of FIG. 1 newly applied to an IPT system.

FIG. 3 is a circuit diagram for an IPT pick-up according to one embodiment of the invention.

FIG. 4 is a diagram of voltage plotted against time for a circuit according to FIG. 3.

FIG. 5 shows experimental and simulated waveforms.

FIG. 6 shows observable Q for a range of θ and normalised load resistance.

FIG. 7 shows an example of voltage and current relationships in the circuit of FIG. 3, including angles θ and θ.

FIG. 8 is a diagram of θ plotted against (θ-90) degrees.

FIG. 9 is a diagram of output power plotted against phase delay for different tuning capacitors for a circuit such as that shown in FIG. 3.

FIG. 10 is an example of a circuit diagram for a practical implementation of the circuit of FIG. 3 further including a DC rectifier to provide a DC output.

FIG. 11 is an example of a circuit diagram for a practical implementation of the circuit of FIG. 3 adapted to provide both an AC and a DC output.

DESCRIPTION OF AN EMBODIMENT OF THE INVENTION

FIG. 1 is a well-known diagram in Power Systems and is used to describe how power is transferred from a generator to another generator or load. The first generator has an output voltage $V_1$ and is connected to the second voltage $V_2$ through an inductor $L_1$. If the phase angle between $V_1$ and $V_2$ is $\alpha$ then the power transferred is given by $$P = \frac{V_1 V_2 \sin(\alpha)}{X}$$

Where X is the reactance of inductor $L_1$ at the frequency of operation. This is a generic formula using symbols common in Power Systems analysis.

In an IPT system this same diagram may be interpreted slightly differently as shown in the circuit of FIG. 2. In this case $V_1$ is the voltage induced in the pick-up coil $L_1$ by a current flowing through an IPT track. Thus $V_1=j\omega MI$ where I is the track current. $V_2$ is now the voltage across the tuning capacitor, C, and is the resonant voltage in the IPT system. $L_1$ and C comprise a parallel resonant circuit. In all usual circumstances the phase angle $\alpha$, the angle between $V_1$ and $V_2$, is determined naturally by the operation of the circuit of FIG. 2 under the loading conditions, represented by load resistor R, that obtain from time to time in the circuit. This angle $\alpha$ cannot be observed in the circuit notwithstanding the fact that full circuit analysis is possible as all of the circuit components are linear.

However in one embodiment of the invention two new circuit elements are added to the circuit—switches $S_1$, and $S_2$, which are in series with diodes $D_1$ and $D_2$ as shown in FIG. 3. These switches are operated to disrupt the action of the circuit such that the phase angle $\alpha$ is forced to be a different value to that which would naturally occur. The technique for achieving this is to maintain voltage $V_2$ at a substantially constant level for a selected time period, for example to clamp voltage $V_2$ so that it cannot cross zero until the switches so allow. Thus Switch $S_1$ prevents a rise in the positive voltage across the tuning capacitor C and switch $S_2$ prevents the voltage across the tuning capacitor from going negative. In operation these switches are switched on or off for 180 degrees but are delayed in phase relative to the normal voltage in the circuit as shown in FIG. 4. The overlap between the normally resonant voltage and the switching waveform is $\theta$ and it must be noted that this $\theta$ is not the generic angle $\alpha$ which is the phase angle between $V_1$ and $V_2$ in FIG. 1, but changing $\theta$ forces a change to $\alpha$. The induced voltage in the pick-up coil, $j\omega MI$, is not observable when the circuit is operating with a real load but the current in the track has the same phase and it is easy to observe. Switch $S_1$ is on for most of the negative half cycle of the waveform—where it has no effect—and for a small portion of the normal positive half cycle where it prevents any voltage rise until it turns off. Switch $S_2$ operates in the other half cycle in an exactly complementary way. Both switches are on for 180 degrees but there is no overlap at all. The actual output voltage has small flat periods in it during the angle $\theta$ but for high Q conditions these almost disappear. However the waveform is still displaced and therefore the power transferred is reduced in a controllable fashion. Thus $\theta$ can be implemented by controlling the switches $S_1$ and $S_2$ to activate as required to hold the tuning capacitor voltage at a desired level for selected intervals. In one embodiment, the tuning capacitor voltage is clamped for a selected time period in each cycle of the resonant circuit. In other embodiments the capacitor voltage may be clamped for selected time periods in selected cycles. In one embodiment the voltage at which the tuning capacitor is clamped is substantially zero volts.

In one practical embodiment of the circuit the phase of the track current is captured by a separate sensor on the track. Then using a phase locked loop precise 180 degree conduction square wave voltage references may be generated. These reference voltages may then be delayed as required with a microprocessor to give waveforms suitable for driving the switches to control the output voltage. The switches themselves are unidirectional and power MOSFETs provide a low cost choice. These are particularly easy to drive as with 180 degree gate drive signals simple transformer isolation is suitable. Observed and simulated waveforms in the circuit are shown in FIG. 4 for a range of conditions corresponding to high Q through to low Q. Note that while the switches are gated on for 180 degrees the actual overlap angle $\theta$ is much less than this and in a practical high Q circuit is small to the point of being imperceptible. Nonetheless the resonant waveform is not correctly phased for unity power factor as the phase has been altered to adjust the power transfer and the circuit has a small leading power factor load reflected back to the track.

Analytical analysis of the circuit is intractable however an expression for the resonant voltage $V_2$ that gives good correlation with both computer simulations and with practical measurements is:

$$V_2 = \frac{V_1 R}{X} \cos\left(\frac{\theta}{2}\right) \cdot \cos\left(\frac{3\theta}{4}\right)$$

A computer simulation of this expression is plotted in FIG. 6 which may be compared with the mathematical expression above and is reasonably accurate over the full range of operation $0.1 < Q < 10$.

$$\left[\left(\text{Note } Q = \frac{V_2}{V_1} = \frac{R}{X}\right)\right]$$

This circuit has many applications. In one example the circuit is particularly appropriate for lighting control as it can drive both fluorescent lights and incandescent lights over a wide range of brightness with excellent resolution and at low cost.

Referring to FIG. 7, it can be seen that for an overlap angle of $\theta$ there is an ideal control angle $\hat{\theta}$ which has a unique relationship to the Q of the circuit and to $\theta$ but is measurable with respect to the voltage induced in the pickup coil. The voltage induced in the pickup coil can only been observed if the pickup coil is unloaded, or alternatively, the phase information can be determined from the IPT track (i.e.

from the primary conductive path of the IPT system that provides a magnetic field for interception by one or more pickups).

FIG. 8 shows the difference between the angles $\theta$ and $\dot{\theta}$.

In some applications it is desirable to be able to operate the circuit without needing a phase reference to determine the $V_{OC}$ as shown in FIG. 7. We have found that the correct overlap angle may be determined by observing the angle at which the resonant voltage in the circuit changes sign, and possible control strategies are described further below. Those skilled in the art to which the invention relates will appreciate that the angle at which the resonant voltage in the circuit changes sign can be determined in a number of different ways. For example, one approach is to use a comparator, with a reference to the ground rail to detect the 0.6 V to 1.0V voltage that leads to conduction of each of the diodes connected in series with the switches ($S_1$ and $S_2$ in FIG. 3). Another possible approach is to use a current transformer on the drain lead of each of the FETs (used in practice to implement switches $S_1$ and $S_2$) in order to detect the onset of current in each switch.

Operating Modes and Control of Embodiments of this Circuit

Depending on whether there is a track sensor or not the control of this circuit can be adapted as required.

(a) With a Phase Reference

Open Loop Control

In operation the circuit acts like an AC current source so if $\dot{\theta}$ is set and held constant the output will be essentially a constant current. This control method relies on a track current sensor to get a reference to start measuring $\dot{\theta}$ from. The method is not ideal since if the output load resistor becomes very large—for example an open circuit then the output voltage will increase without sensible limit and some overvoltage protection must be incorporated. Note that as shown in FIG. 8 if $\dot{\theta}$ is set then $\theta$ is also largely determined as there is a one to one relationship between them so that this method is simple to use.

Closed Loop Control

With closed loop control the value of $\dot{\theta}$ is known and may be adjusted directly. A sensor for the required output parameter—current, voltage, or power—is used and the measured value is compared with a set point value. If the measured value is too high then $\dot{\theta}$ is slowly increased, if it is too low then $\dot{\theta}$ is reduced. Clearly more than one comparison may be made at any time so that a more complex controller is simple—e.g. current control to a set point voltage and then voltage control after that.

(b) With No Track Current Sensor

With no current sensor, the same control methods as above may still be used but $\dot{\theta}$ cannot be measured directly. In fact, $\theta$, the overlap angle, is sufficient to control the whole operation. Direct control of $\theta$ in this system is simplified by noting that whenever one or other switch ($S_1$ or $S_2$) is conducting it corresponds to operation in the overlap angle $\theta$, so that $\theta$ may be directly controlled by turning off the switches when the desired overlap angle is reached. Since larger $\theta$ corresponds to lower resonant voltages in perfectly tuned systems, controlling $\theta$ controls power output or current output or voltage output as required. The only difficulty is in getting the system started.

One method for achieving this is as follows. If both switches ($S_1$ and $S_2$) are held partially on using simple pull up resistors, the resonant capacitor voltage is automatically clamped as it crosses zero, limiting the resonant voltage—this corresponds to the situation where $\theta$ nearly equals 180 degrees. By using a current transformer with its primary coil in series with the switches, a current will be induced in the secondary side of the current transformer whenever current flows through the switches, with the induced current's polarity indicating the positive and negative half-cycles of the resonant current. Upon change of the induced current's polarity, the overlap period is known to have started. The end of the overlap period occurs when the controller drives the relevant switch OFF. Thus, the microprocessor is now synchronized with the capacitor voltage and this voltage can be increased slowly to give the output voltage, current or power required.

Once started, the output voltage can be increased slowly by gradually decreasing $\theta$. If $\theta$ is decreased too rapidly, the switches may short the resonant capacitor while it is charged, causing destruction of the switches. If it is desired that the output voltage be rapidly increased, the switches can be turned off, allowing the resonant voltage to increase to a level limited by the circuit Q. Once the circuit reaches a steady state, $\theta$ can be rapidly increased from zero to the desired value to set the output voltage.

In one embodiment $\theta$ is best measured from only one transition. For example $\theta$ could be measured from a positive going zero crossing for one switch and from a negative going zero crossing for the other. In our experience this procedure may not produce symmetrical waveforms. Therefore, in one practical embodiment it is best to measure it from say the positive zero crossing for driving the positive conducting switch and then add 180 degrees and use that to drive the other switch. Thus for an overlap angle of perhaps 75 degrees the positive current conducting switch is turned OFF 75 degrees after the positive going zero crossing and the negative conducting switch is simultaneously turned ON. 180 degrees later the positive conducting switch is turned ON and the negative conducting switch is turned OFF. The next switching operating is then triggered by the zero crossing with the same delay of 75 degrees, and so on.

Once $\theta$ is controlled power voltage or current control is achieved in the same way as described above for the case where there is a separate track current sensor.

Tuning the Circuit to Allow for Component Tolerance

In the operation of the circuit described both the short-circuit current and the induced voltage are affected as the firing angle is changed and the circuit operates as though L the pick-up coil inductance, C the tuning capacitor, and M the mutual inductance between the IPT track and the pick-up coil are all altered. The variation in M has already been used to vary the output power and control it. But apparent variations in L and C can be used to tune the circuit as shown in FIG. 9. Here the output power of the circuit is measured as the overlap angle $\theta$ varies from essentially zero to 150 degrees. As expected if the tuning capacitor is exactly correct then the maximum power occurs at a firing angle of zero. But if the tuning capacitor is too small then the maximum power occurs at an increased firing angle and the circuit can be tuned by varying this firing angle. For capacitor values 20% below the design value the system can be tuned to have a power loss of about 1% compared with perfect tuning—but now with a component error of 20%. Capacitors that are too large cannot be tuned as firing in advance causes the switches to short circuit the resonating capacitor.

Other Applications

The AC power transfer and control methods disclosed herein may also be used to provide a DC output. Most simply as shown in FIG. 10 a bridge rectifier and DC inductor may be added to the controlled AC output to give a DC output voltage while retaining the same characteristics as the AC output circuit. In these circumstances four extra diodes are needed for the bridge rectifier. There is at least one practical application where this circuit is highly beneficial. In the charging of electric vehicles across a large air gap a design objective might be to achieve an output power of 2 kW or more across a large air gap. A problem now arises if the air gap is significantly reduced so that the coupled voltage may be much larger than when operating under normal conditions. Such variations must be expected—for example the vehicle might have a flat tyre or it may be under repair with the receiving pad (i.e. the pick-up coil arrangement) parked on top of the floor pad (the primary coil arrangement connected to a power supply) to charge the battery. Here the induced open circuit voltage may be 3-4 times larger than the normal value and the short-circuit current of the pick-up coil will likewise be 3-4 times larger. The power coupled by the disclosed circuit can be turned down by increasing the angle θ to a value approaching 120 degrees to control the power flow to one that can be sustained by the power supply of the system. The current in the pick-up coil, the voltage across the tuning capacitors, and the current in the rectifier and the DC inductor all remain essentially at their rated values and there is no damage incurred. However with a conventional controller (such as that disclosed in U.S. Pat. No. 5,293,308) the short circuit current would be 3-4 times larger and this current would flow through the rectifier, DC inductor, and the switch and will significantly stress these components. To increase the current ratings of these devices by 4 times may not be a practical proposition as the physical size of the DC inductor in the circuit will be greatly increased.

The circuit of FIG. 10 may also be redrawn as in FIG. 11 where the rectifier now works in conjunction with the switches and only two extra diodes are needed instead of a diode bridge. FIG. 10 uses switches in inverse parallel whereas the new FIG. 11 uses the same switches in inverse series. This new circuit allows the use of the inverse parallel diodes in the MOSFETS so that the diode count can be reduced to be the same as in the original AC circuit. Note that the diodes in the MOSFETs switch the resonating current which may be quite large while the other diodes switch the DC output current which is a lot smaller so that the two extra diodes are much smaller than the diodes in the conceptual circuit of FIG. 3. Using large MOSFETs such as these to switch high power circuits at VLF frequencies to 50 kHz or more is usually not practical as the inverse parallel diodes in the devices have such poor reverse recovery characteristics that the circuit losses are too high. Here it is possible as all the devices are soft switched at essentially zero voltage switching both ON and OFF, and at zero current when turning ON. Also, as shown, this circuit can have a DC and an AC output at the same time but these are not independently controllable. They do however provide a reference that may be grounded (as shown) so that both switches can be driven from a common low voltage power supply. Either circuit (FIG. 10 or FIG. 11) may also include an optional capacitor $C_1$, (shown on FIG. 11) in series with the pick-up coil $L_2$, for increasing the short circuit current of the pick-up. In practice the series combination of $C_1$ and $C_2$ is tuned with the pick-up coil $L_2$ and the circuit then functions as before.

Although certain examples and embodiments have been disclosed herein it will be understood that various modifications and additions that are within the scope and spirit of the invention will occur to those skilled in the art to which the invention relates. All such modifications and additions are intended to be included in the scope of the invention as if described specifically herein.

The word "comprise" and variations such as "comprising", unless the context clearly requires the contrary, is intended to be interpreted in an inclusive sense (i.e. as meaning "including, but not limited to").

What I claim is:

1. A resonant inductive power pickup comprising:
   a pickup coil,
   a tuning capacitor connected to the pickup coil in a resonant circuit,
   a rectifier connected to the resonant circuit and configured to rectify AC power from the pickup coil for supply to a load, and
   a switch connected in parallel with the tuning capacitor,
   wherein the pick-up is configured to control the power coupled into the pickup coil by shorting the tuning capacitor for part of the resonant cycle and thereby manipulate the impedance of the resonant circuit,
   wherein the pickup comprises a battery connected to an output of the rectifier, wherein the rectifier is connected between the battery and the resonant circuit, and wherein the pickup is configured charge the battery with power received by the pickup coil and rectified by the rectifier.

2. The pickup of claim 1, wherein the pickup is configured to adjust the phase and/or duty cycle of the switch to control the phase angle between the voltage of the tuning capacitor and the voltage induced in the pickup coil.

3. The pickup of claim 1, wherein the pickup is configured to supply power to an electric vehicle, and wherein the pickup is configured to control the impedance of the resonant circuit to compensate for load variations caused by the position of the pickup coil relative to the coil of an inductive power primary that is transferring power to the electric vehicle.

4. A resonant inductive power pickup comprising:
   a pickup coil,
   a tuning capacitor connected to the pickup coil in a resonant circuit,
   a rectifier connected to the resonant circuit and configured to rectify AC power from the pickup coil for supply to a load, and
   a switch connected in parallel with the tuning capacitor,
   wherein the pick-up is configured to control the power coupled into the pickup coil by shorting the tuning capacitor for part of the resonant cycle and thereby manipulate the impedance of the resonant circuit,
   wherein the pickup is configured to rectify power, from the resonant circuit, for supply to the load when the switch is in a non-conducting state, and the pickup is configured to short an input to the rectifier, from the resonant circuit, when the switch is in a conducting state to prevent power supply to the load.

5. The pickup of claim 4, wherein the pickup is configured to adjust the phase and/or duty cycle of the switch to control the phase angle between the voltage of the tuning capacitor and the voltage induced in the pickup coil.

6. The pickup of claim 4, wherein the pickup is configured to supply power to an electric vehicle, and wherein the pickup is configured to control the impedance of the resonant circuit to compensate for load variations caused by the position of the pickup coil relative to the coil of an inductive power primary that is transferring power to the electric vehicle.

* * * * *